UNITED STATES PATENT OFFICE.

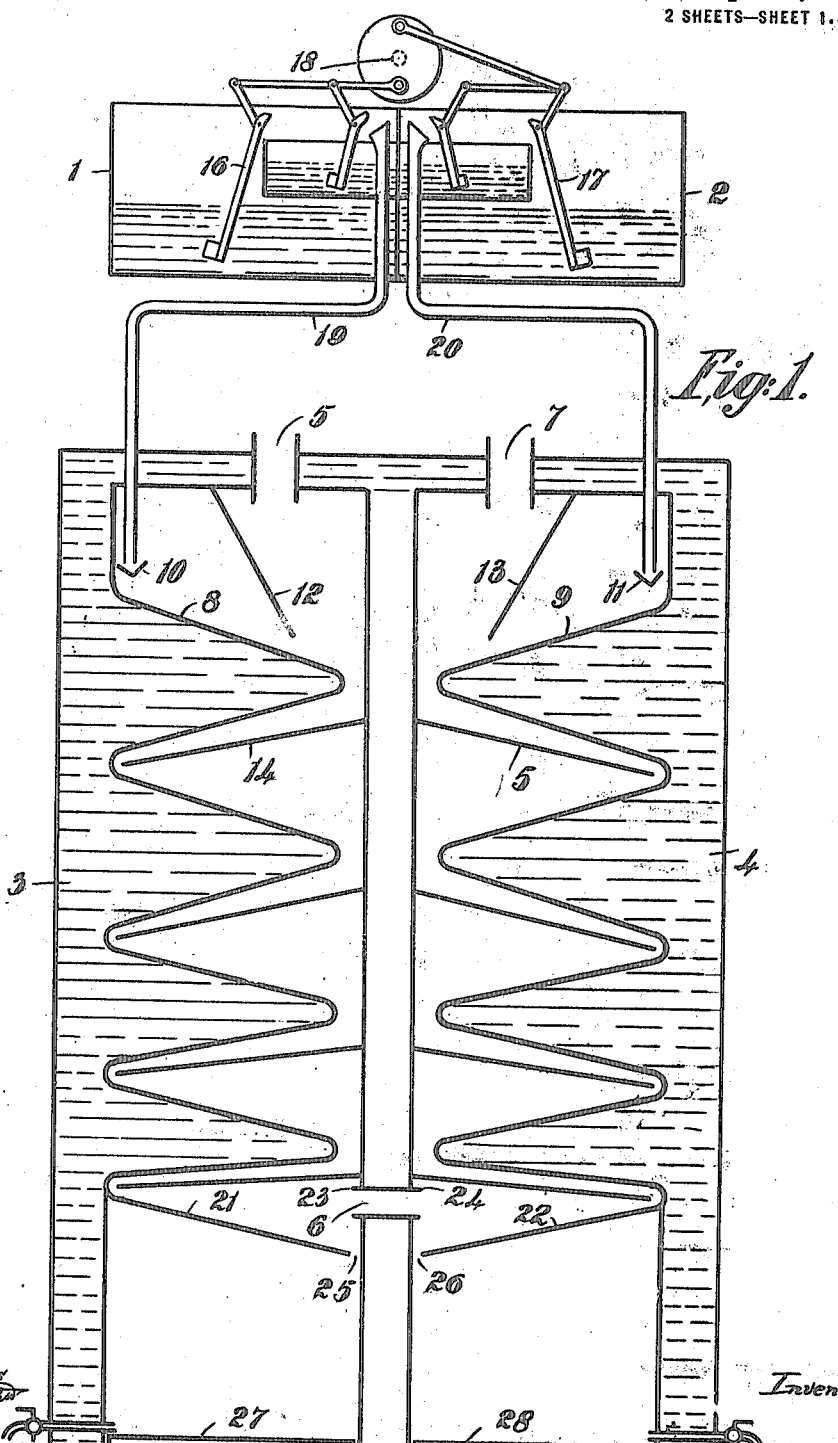

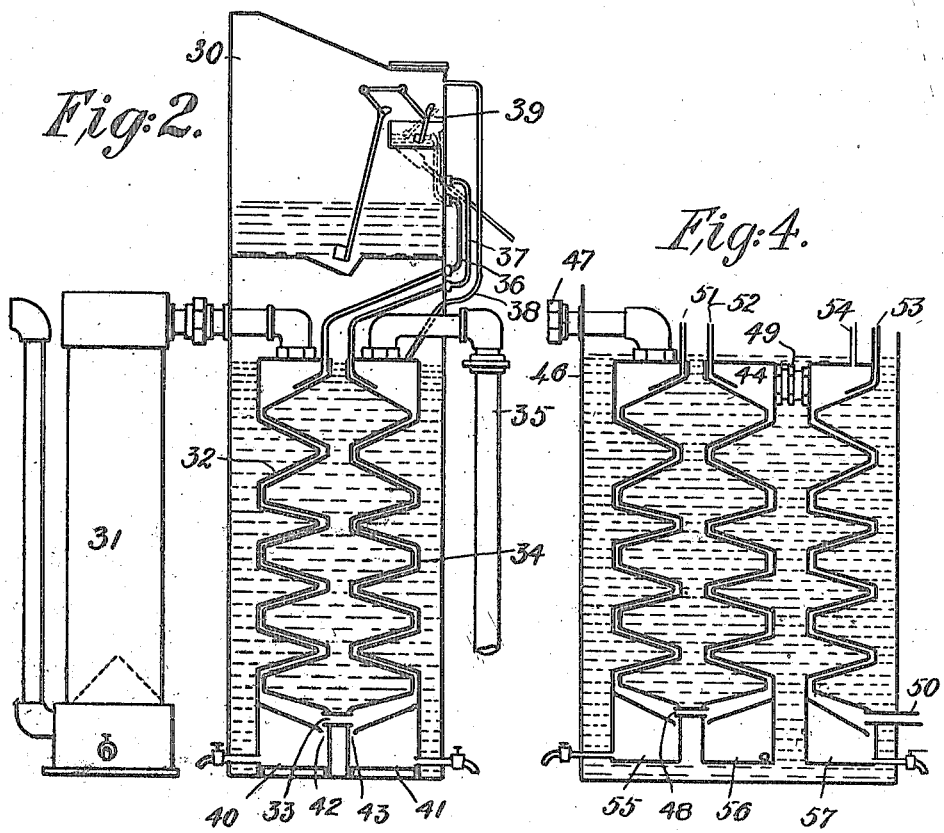
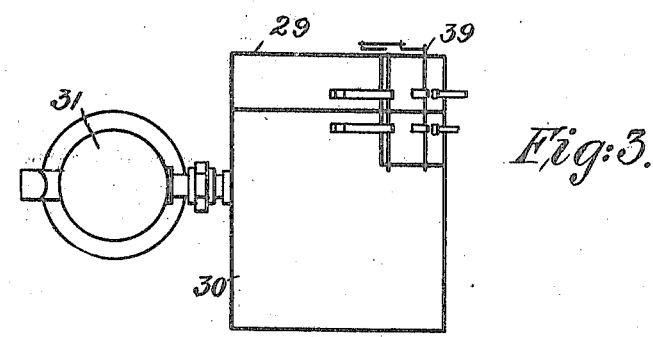

HUBERT ELWELL SMITH, OF ATTADALE, BUSH HILL PARK, ENGLAND.

CARBURETER.

1,264,699.

Specification of Letters Patent.

Patented Apr. 30, 1918.

Application filed June 18, 1914. Serial No. 845,861.

*To all whom it may concern:*

Be it known that I, HUBERT ELWELL SMITH, a subject of the King of Great Britain, residing at Attadale, Bush Hill Park, Middlesex, England, have invented new and useful Improvements in and Connected with Carbureters, of which the following is a specification.

This invention relates to carbureting apparatus, especially of the kind employed to produce a mixture of petrol vapor and air, usually known as petrol gas for lighting and heating purposes.

The present invention consists in the combination of two or more sets of sloping plate carbureters for the purpose of treating the residue part of the petrol, which is the more difficult to deal with, by exposing it to the uncooled air which is capable of producing the greater amount of action upon it. Each carbureter comprises flat sloping surfaces such as plates, over which the hydrocarbon trickles. The invention provides a draining device at the bottom of each carbureter, from which the petrol residue can drain into a false bottom, from which it may be removed.

The invention is illustrated in the accompanying drawings, in which:—

Figure 1 shows a double sloping plate carbureter, while

Figs. 2 and 3 show in sectional elevation and plan respectively of a modified form of carbureter.

Fig. 4 shows a slight modification of the arrangement shown in Figs. 2 and 3.

As shown in Fig. 1, there are two tanks, the residue tank 1 and the tank for petrol of ordinary specific gravity 2. The tank 1 is made much smaller than the tank 2 on account of the relatively small amount of residue. This is effected by making them of different depths at right angles to the plane of the drawing. There are two carbureter chambers illustrated, 3 and 4, the carbureter chamber for the residue 3, being supplied with the warmest air, that is, air which as yet has not been cooled by any evaporation, through a pipe 5, which air after passing down the plates of carbureter 3, through connection 6 and up the plates of carbureter 4, escapes through the outlet pipe 7. The carbureters shown consisting of plates 8 and 9, which are arranged in a zigzag manner and have a gradually decreasing slope toward the bottom of the carbureter. The petrol or other hydro-carbon is supplied preferably by a device insuring its supply proportional to that of the air; for example, by a spoon feed driven from the air-pump to a V-shaped trough 10 or 11 to the uppermost plate 8 or 9, and baffles 12 and 13 are employed for preventing the disturbance of the petrol in the trough. The petrol is thus supplied to the plates in very thin streams and spreads over the surface of the plates, passing right to the bottom of the apparatus without actually leaving them. In order to confine the air to the surface of the plates means are provided shown as baffles 14 and 15.

As illustrated spoon feeds 16 and 17 for the residue and petrol respectively are shown actuated from a single spindle 18. The residue and normal petrol are supplied through pipes 19 and 20 to their respective carbureters. At the bottom of each carbureter a sloping plate 21 and 22 is arranged and the petrol is prevented from passing through the air connecting pipe by the projecting ends 23 and 24. It drains down the plates 21 and 22 and passes through drip-openings 25 and 26 into false bottoms 27 and 28 from which the residue may be drawn in order to return it to the tank 1.

As above mentioned, if there is not sufficient refuse to supply the tank 1, a small quantity of petrol of normal specific gravity may be added to supplement it in that tank.

The fresh air as yet uncooled by any evaporation of petrol and as yet containing no petrol vapor is passed through the carbureter to which the residue is supplied. This residue has a less vapor tension than the original petrol and therefore the air is saturated by a smaller percentage of it. Hence it must be supplied in much smaller proportion to the air than the petrol in the main carbureter. The air passing from the residue carbureter, although incapable of vaporizing any more residue then operates upon the petrol of ordinary specific gravity which it can evaporate because this petrol is more volatile.

In the construction shown in Figs. 2 and 3 a slightly different type of carbureter is employed. Sloping plates are arranged to form flat zigzag tubes for the passage of the air and petrol. In this case the residue tank 29 is shown arranged behind the ordinary petrol tank 30. The warm air after passing through a purifier 31 passes as in the arrangement shown in Fig. 1, into carbureter 32 in which the residue is vaporized and then passes through the bottom pipe 33 into carbureter 34 for the ordinary petrol, and the vapor passes out by outlet pipe 35. In this apparatus there are two supply pipes, 36 for the residue and 37 for the petrol of normal specific gravity, the carbureter being supplied with an air vent 38. In this arrangement the two spoon feeds are actually arranged upon the same spindle 39. False bottoms 40 and 41 are employed as before with drip holes 42 and 43.

Fig. 4 shows a modification of Figs. 2 and 3 with the tank arrangements removed. In this case there are two carbureters for the petrol of normal specific gravity, namely, 44 and 45, but only a single one 46 for the residue. The warm air therefore passes in through the inlet pipe 47 to the residue carbureter 46, through the pipe 48 to carbureter 44, through pipe 49 to carbureter 45, and so out through outlet 50. There is one supply tube 51 for the residue and two supply pipes 52 and 53 for the petrol of normal specific gravity, and an air vent 54. Each carbureter has a false bottom 55, 56 and 57 and there are drip openings 58, 59 and 60 for the residue. The devices shown in Figs. 2 and 4 otherwise operate in entirely the same way as that shown in Fig. 1.

In some cases it is found that an amount of residue about 10% of the amount of petrol used remains over, but in some cases the amount of the residue may amount to about 17%. Obviously then, the tanks and the rest of the apparatus must be designed to allow for rather more than 17% of residue, say roughly 20%.

By all these arrangements according to the present invention, the maximum quantity of heat may be obtained from any given volume of petrol, because the residue finally left over, if any, is very small indeed, and in this way an extremely efficient lighting plant may be constructed.

What I claim is:—

1. A carbureting apparatus comprising a casing provided with a plurality of chambers or compartments each having an inner wall or side consisting of inclined surfaces arranged continuously in zigzag manner, an air inlet at the upper end of the first chamber, said first chamber being connected by a channel with a second chamber at their lower ends, separate means for introducing hydrocarbon fluid into the chambers and directing it upon the uppermost inclined surface, and an outlet from the upper end of the second chamber, whereby the air is caused to pass downwardly over the inclined surfaces in the first chamber and then upwardly over the inclined surfaces in the second chamber.

2. A carbureting apparatus, comprising a casing provided with a plurality of chambers or compartments each having an inner wall or side having inclined surfaces arranged continuously in substantially zigzag manner, forming alternate upwardly facing and downwardly facing portions, the inclination of said surfaces from the horizontal decreasing from the top downwardly, baffles coöperating with said downwardly facing portions and arranged substantially parallel therewith to form confined passages, means for introducing hydrocarbon fluid into the upper ends of said chambers and directing it upon the uppermost inclined surface, an air inlet at the upper end of the first chamber, and an outlet from the last chamber, adjacent chambers being connected by channels arranged alternately at the opposite ends, whereby the air is caused to pass successively over the zigzag surfaces and in opposite directions in adjacent chambers.

In testimony whereof I sign my name to this specification in the presence of two subscribing witnesses.

H. ELWELL SMITH.

Witnesses:
H. W. K. JENNINGS,
R. M. HUGHES.